United States Patent
Huang

(10) Patent No.: US 9,855,965 B2
(45) Date of Patent: Jan. 2, 2018

(54) VIBRATION DAMPENING DEVICE AND INFANT CARRIER THEREWITH

(71) Applicant: Wonderland Nurserygoods Company Limited, Nt (HK)

(72) Inventor: Ji Hua Huang, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/227,954

(22) Filed: Aug. 3, 2016

(65) Prior Publication Data

US 2017/0050663 A1 Feb. 23, 2017

(30) Foreign Application Priority Data

Aug. 17, 2015 (CN) .......................... 2015 1 0504971

(51) Int. Cl.
*B62B 9/18* (2006.01)

(52) U.S. Cl.
CPC ............ *B62B 9/18* (2013.01); *B62B 2301/20* (2013.01)

(58) Field of Classification Search
CPC .... B62B 9/18; B62B 7/00; B62B 7/04; B62B 2301/20–2301/23
See application file for complete search history.

(56) References Cited

U.S. PATENT DOCUMENTS

| 2,915,776 A | 12/1959 | Hanson | |
|---|---|---|---|
| 6,663,122 B1 * | 12/2003 | Lin | B62B 7/04 280/267 |

FOREIGN PATENT DOCUMENTS

| CN | 201186720 Y | 1/2009 |
|---|---|---|
| CN | 201240413 Y | 5/2009 |
| CN | 203332192 U | 12/2013 |

* cited by examiner

*Primary Examiner* — Erez Gurari
(74) *Attorney, Agent, or Firm* — Winston Hsu

(57) ABSTRACT

An infant carrier includes a carrier frame, a wheel, and a vibration dampening device disposed therebetween. The vibration dampening device includes a first vibration dampening part, a second vibration dampening part, and an actuator. The first and the second vibration dampening parts are disposed between the carrier frame and the wheel. The actuator is movably disposed on the carrier frame or the wheel. The releasing position has a releasing position and an enabling position for adjusting an action range of the second vibration dampening part moving to the actuator. Therefore, the action range can be adjusted by adjusting the position of the actuator for making an vibration dampening effect performed by the first vibration dampening part or by the first vibration dampening part together with the second vibration dampening part, so that the infant carrier can adapt to different road conditions by adjusting the vibration dampening device through the actuator.

21 Claims, 12 Drawing Sheets

VIBRATION DAMPENING DEVICE AND INFANT CARRIER THEREWITH

BACKGROUND OF THE INVENTION

1. Field of the Invention

The invention relates to a carrier, and especially relates to a vibration dampening device and an infant carrier having the vibration dampening device.

2. Description of the Prior Art

As the society advances in economy and technology, people are provided with a variety of consumer goods for higher quality of life. Infant carriers are one of various consumer goods. For parents having child, when they take their child for a walk or shopping, they usually carry their child by using an infant carrier with wheels instead of by arms for reducing their loads. The infant carrier is also of comfort and safety. Therefore, infant carriers are more and more popular.

It is known that when the infant carrier is pushed to move in a trip, the infant carrier may encounter various road conditions in different bumpy degrees leading to various jolts to the infant carrier. For example, when encountering a road with a large bumpy degree, the infant carrier will be jolted wildly; when encountering a road with a less bumpy degree, the infant carrier will be jolted slightly. However, vibration dampening structures used in the current infant carriers are very simple and cannot be adjusted for adapting the infant carriers to various roads with different bumpy degrees for meeting requirements for dampening vibration on the roads. The infant carriers are not served with good vibration dampening effect, so that the infant carriers are poor in adapting to various roads. Consequently, when running on various roads, the current infant carriers cannot guarantee comfort and safety to the infants sitting therein.

Therefore, there is a need of a vibration dampening device and an infant carrier with the vibration dampening device for overcoming the above problems.

SUMMARY OF THE INVENTION

An objective of the invention is to provide a vibration dampening device. The vibration dampening device can be adjusted according to different road conditions for guaranteeing comfort and safety to the infant sitting in an infant carrier with the vibration dampening device.

A vibration dampening device according to the invention is used in an infant carrier. The infant carrier includes a carrier frame and a wheel. The vibration dampening device is disposed between the carrier frame and the wheel. Therein, the vibration dampening device includes a first vibration dampening part, a second vibration dampening part, and an actuator. The first vibration dampening part and the second vibration dampening part are disposed between the carrier frame and the wheel. The actuator is movably disposed on one of the carrier frame and the wheel. Therein, the actuator has a releasing position and an enabling position for adjusting an action range of the second vibration dampening part moving to the actuator.

Preferably, the actuator is separated from the second vibration dampening part by a first movement distance when the actuator is located at the releasing position. The first movement distance is longer than zero. The second vibration dampening part is movable relative to the actuator within the first movement distance. The actuator is separated from the second vibration dampening part by a second movement distance when the actuator is located at the enabling position. The second movement distance is longer than or equal to zero. The second movement distance is shorter than the first movement distance. The second vibration dampening part is movable relative to the actuator within the second movement distance or always contacts the actuator.

Preferably, the vibration dampening device further includes a mount and a rotational base. The mount is disposed on the carrier frame. The rotational base is pivotally connected to the mount. The wheel is disposed on the rotational base. The first vibration dampening part and the second vibration dampening part are disposed between the mount and the rotational base. The actuator is movably disposed on the mount.

Preferably, a limitation post is disposed on one of the rotational base and the mount. The limitation post is parallel to a rotation axis of the rotational base. The other one of the rotational base and the mount has an arc limitation slot extending about the rotation axis of the rotational base. The limitation post slidably passes through the arc limitation slot.

Preferably, the first vibration dampening part is disposed perpendicular to a rotation axis of the rotational base. The second vibration dampening part is disposed parallel to the first vibration dampening part.

Preferably, the vibration dampening device further includes an upper base and a lower base. The upper base is disposed on the mount. The lower base is disposed on the rotational base. An upper end of the first vibration dampening part abuts against the upper base. A lower end of the first vibration dampening part abuts against the lower base.

Preferably, a lower end of the lower base is pivotally connected to the rotational base. A rotation axis of the lower base is parallel to the rotation axis of the rotational base.

Preferably, the rotational base has a pivotal connection portion protruding outward. The lower base is pivotally connected to the pivotal connection portion.

Preferably, the upper base has a first ring recess with a downward opening. The lower base has a second ring recess with an upward opening. The upper end of the first vibration dampening part abuts against the first ring recess. The lower end of the first vibration dampening part abuts against the second ring recess.

Preferably, a lower end of the second vibration dampening part abuts against the lower base. An upper end of the second vibration dampening part slidably passes through the upper base.

Preferably, the lower base has a socket slot. The lower end of the second vibration dampening part is inserted in the socket slot. The upper base has a through hole. The upper end of the second vibration dampening part slidably passes through the through hole.

Preferably, the second vibration dampening part passes through the first vibration dampening part.

Preferably, the mount has a protruding installation portion. The actuator is movably disposed in the installation portion. The upper base is disposed in the installation portion.

Preferably, the installation portion has an accommodating recess. The actuator is partially slidably disposed in the accommodating recess. The actuator is rotatable in the accommodating recess. At least two protrusive steps are disposed on a recess wall of the accommodating recess in a rotational direction of the actuator. A release passageway is formed between adjacent two of the at least two protrusive steps. At least one blocked rib is disposed on a side wall of the actuator in the rotational direction of the actuator. When the actuator is located at the releasing position, the blocked rib is aligned with the release passageway. When the actuator is located at the enabling position, the blocked rib is aligned with one of the at least two protrusive steps and is against the aligned protrusive step.

Preferably, the protrusive step has a curved transition portion and a limitation protrusion. When the actuator is located at the enabling position, the blocked rib is located between the curved transition portion and the limitation protrusion.

Preferably, the vibration dampening device further includes a manipulation part disposed on the actuator.

Preferably, the installation portion has a through hole. The actuator partially passes through the through hole and is connected to the manipulation part.

Preferably, the vibration dampening device further includes an elastic restoring part. An upper end of the elastic restoring part abuts against the actuator. A lower end of the elastic restoring part abuts against one of the installation portion and the upper base. The elastic restoring part always urges the actuator to move in a direction away from the second vibration dampening part.

Preferably, at least one supporting protrusion is disposed on the recess wall of the accommodating recess. The upper base abuts against the at least one supporting protrusion.

Preferably, the first vibration dampening part is a vibration dampening spring.

Preferably, the second vibration dampening part is an elastic vibration dampening core.

Another objective of the invention is to provide an infant carrier. A vibration dampening device of the infant carrier can be adjusted according to different road conditions for guaranteeing comfort and safety to the infant sitting in the infant carrier.

An infant carrier according to the invention includes a carrier frame, a wheel, and a vibration dampening device. The vibration dampening device is disposed between the carrier frame and the wheel. Therein, the vibration dampening device is as described above.

Preferably, the carrier frame has a rear supporting leg. The vibration dampening device is disposed on the rear supporting leg.

Compared with the prior art, in the vibration dampening device according to the invention, the first vibration dampening part and the second vibration dampening part are disposed between the carrier frame and the wheel, and the actuator is movably disposed on one of the carrier frame and the wheel. Therein, the actuator has a releasing position and an enabling position for adjusting an action range of the second vibration dampening part moving to the actuator. Thereby, the action range can be adjusted by adjusting the position of the actuator for making an vibration dampening effect performed by the first vibration dampening part or by the first vibration dampening part together with the second vibration dampening part, so that the infant carrier can adapt to different road conditions by adjusting the vibration dampening device through the actuator. Therefore, the vibration dampening device according to the invention has a good adaptability. In other words, when the infant carrier encounters different road conditions, the actuator of the vibration dampening device can be operated to be switched to the releasing position or the enabling position, so that the vibration dampening effect performed by the first vibration dampening part individually or by both the first vibration dampening part and the second vibration dampening part for adapting the infant carriers to various roads with different bumpy degrees for meeting requirements for dampening vibration on the roads. Therefore, the infant carrier according to the invention can perform good vibration dampening effect under various road conditions, which greatly improves the adaptability of the infant carrier to various road conditions and can guarantee comfort and safety to the infant sitting therein.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
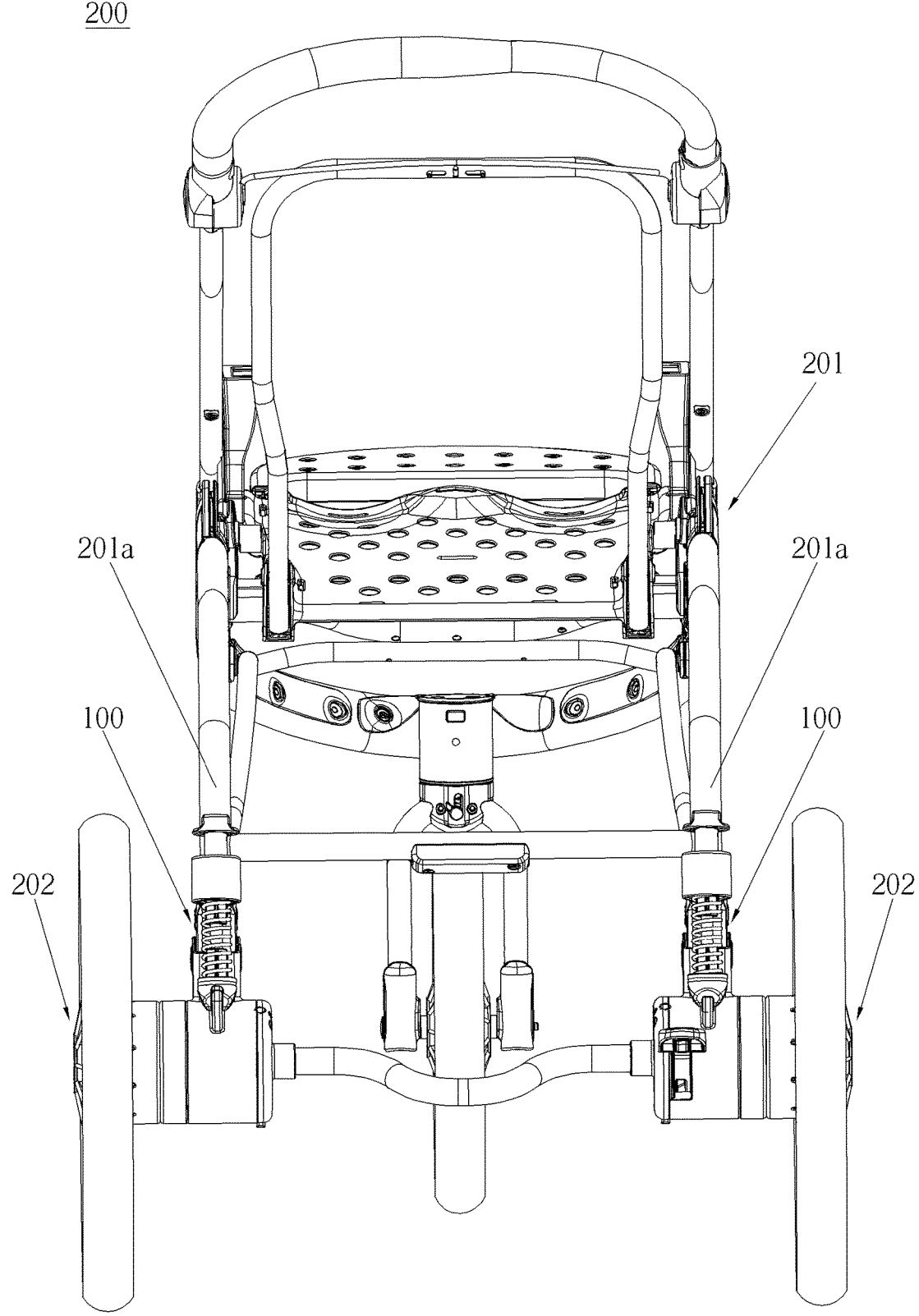
FIG. 1 is a schematic diagram illustrating an infant carrier according to the invention.
Figure 2:
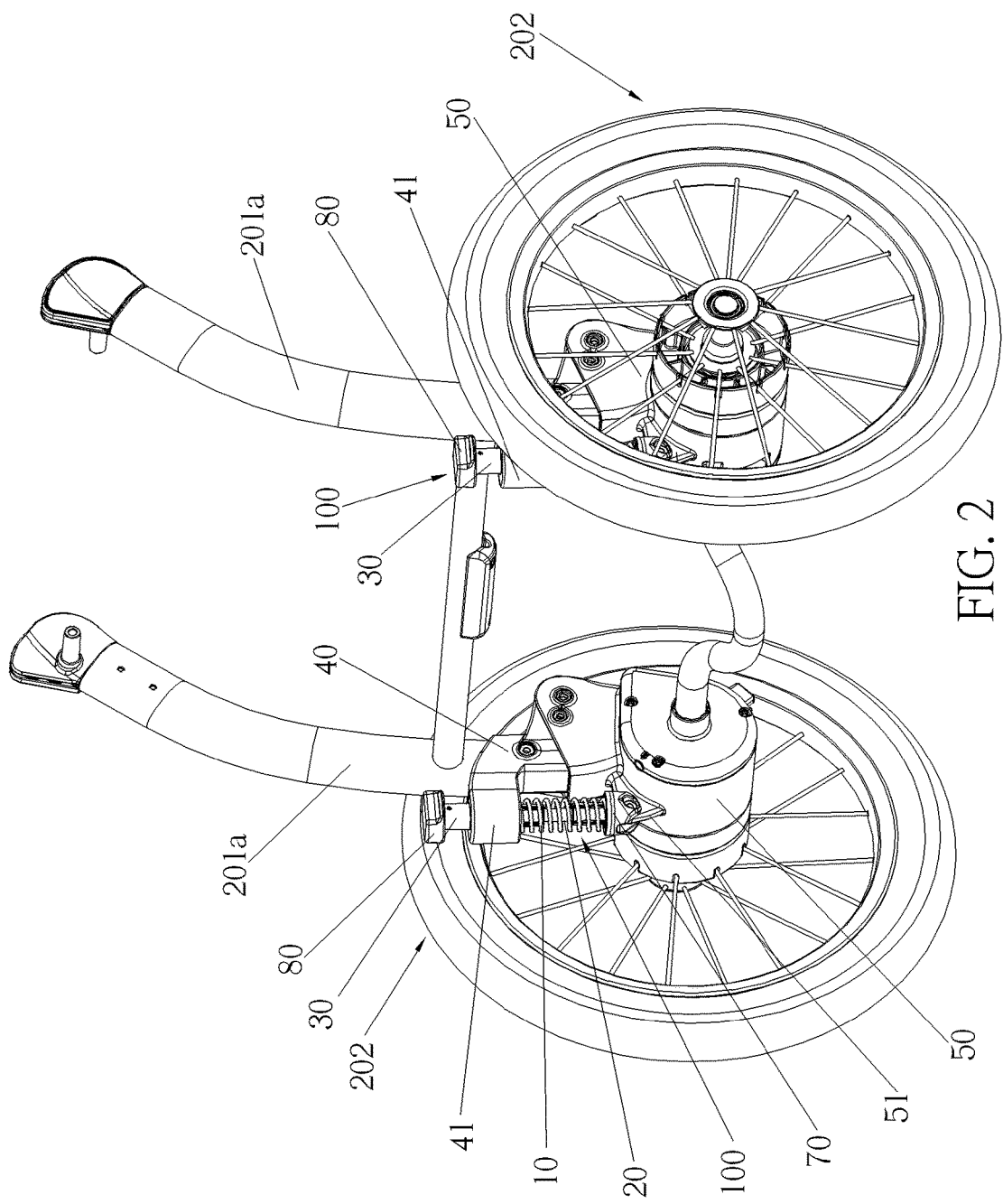
FIG. 2 is a schematic diagram illustrating a vibration dampening device according to the invention disposed between a wheel and a rear leg, and an actuator of the vibration dampening device is located at a releasing position.
Figure 3:
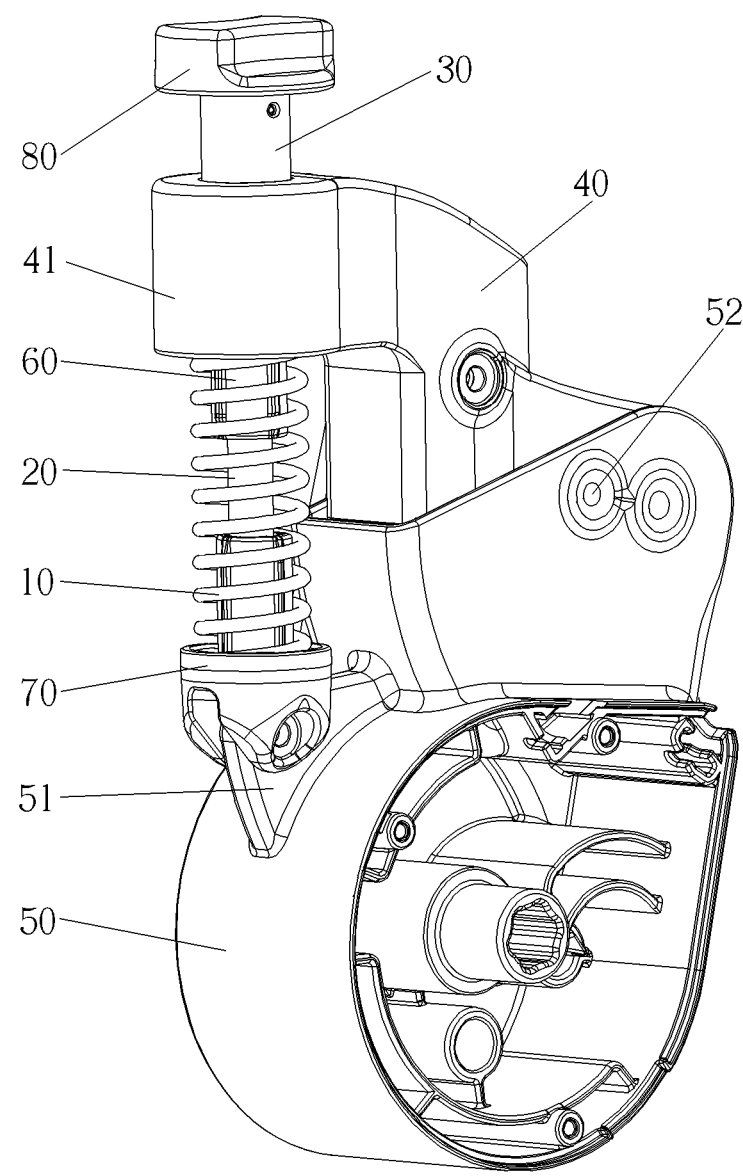
FIG. 3 is a schematic diagram illustrating the vibration dampening device in FIG. 2.
Figure 6:
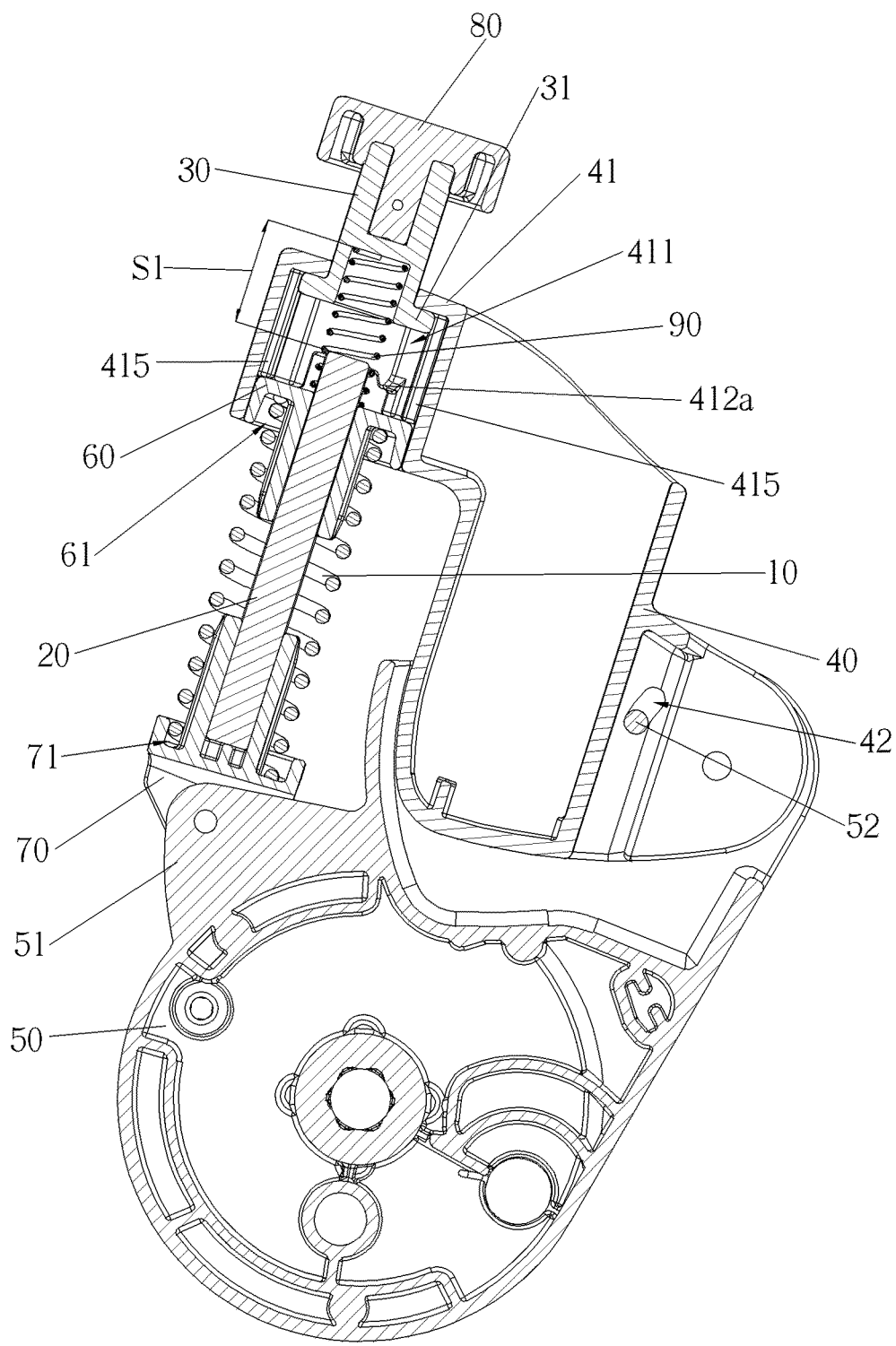
FIG. 6 is a sectional view of the vibration dampening device in FIG. 3.
Figure 7:
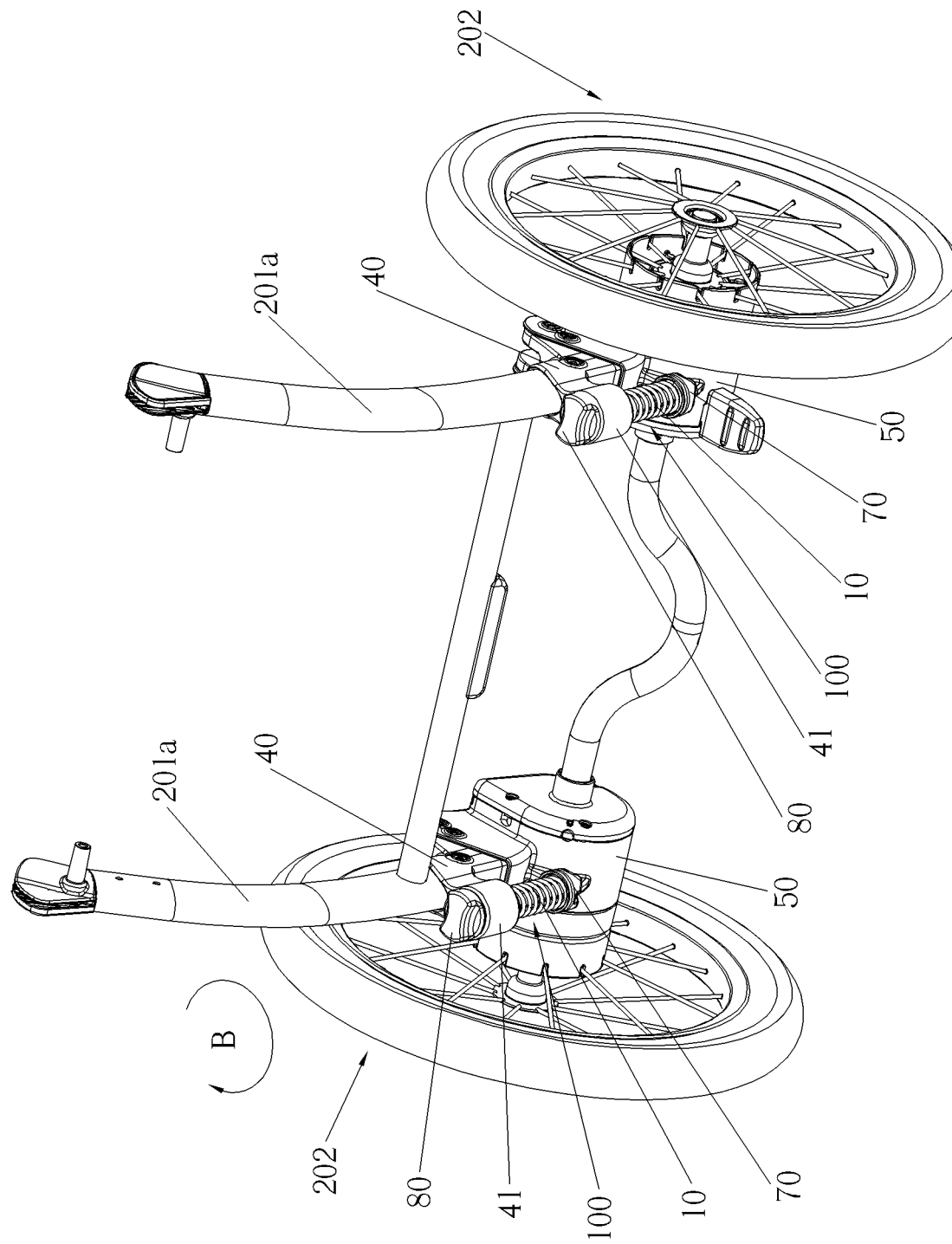
FIG. 7 is a schematic diagram illustrating a vibration dampening device according to the invention disposed between the wheel and the rear leg, and the actuator of the vibration dampening device is located at an enabling position.
Figure 8:
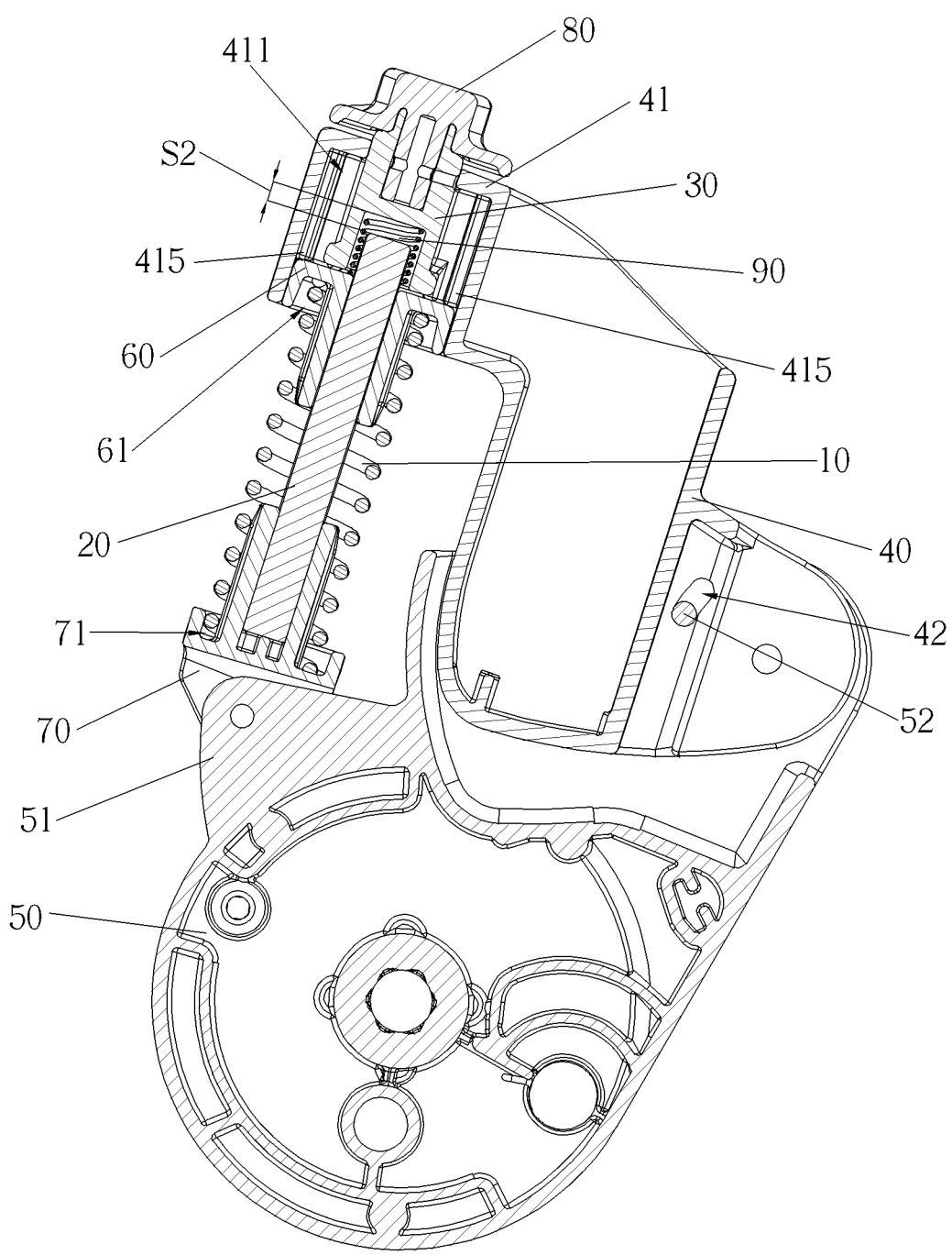
FIG. 8 is a sectional view of the vibration dampening device in FIG. 7.
Figure 9:
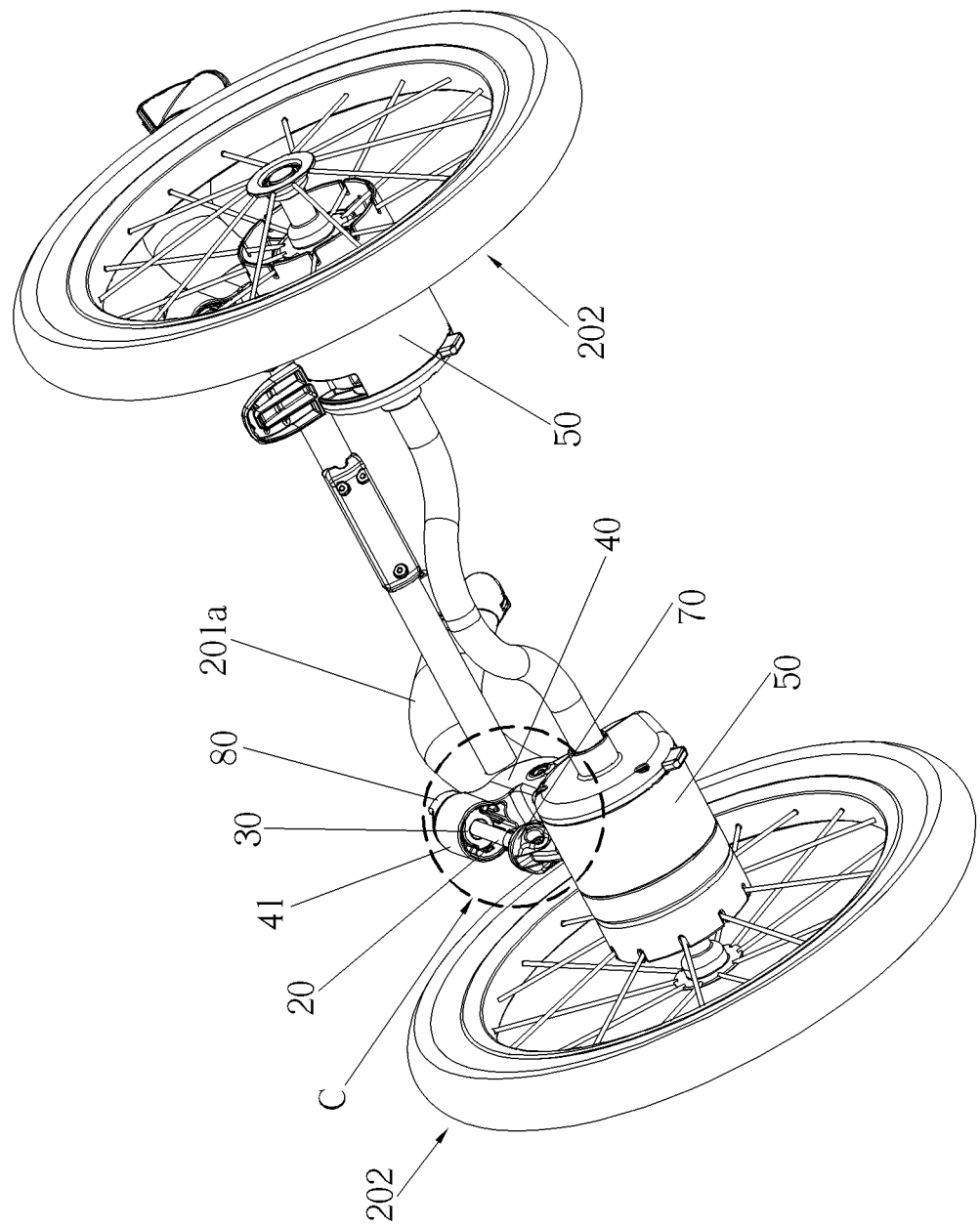
FIG. 9 is a schematic diagram illustrating the vibration dampening device in FIG. 7 without a first vibration dampening part from another view point.
Figure 10:
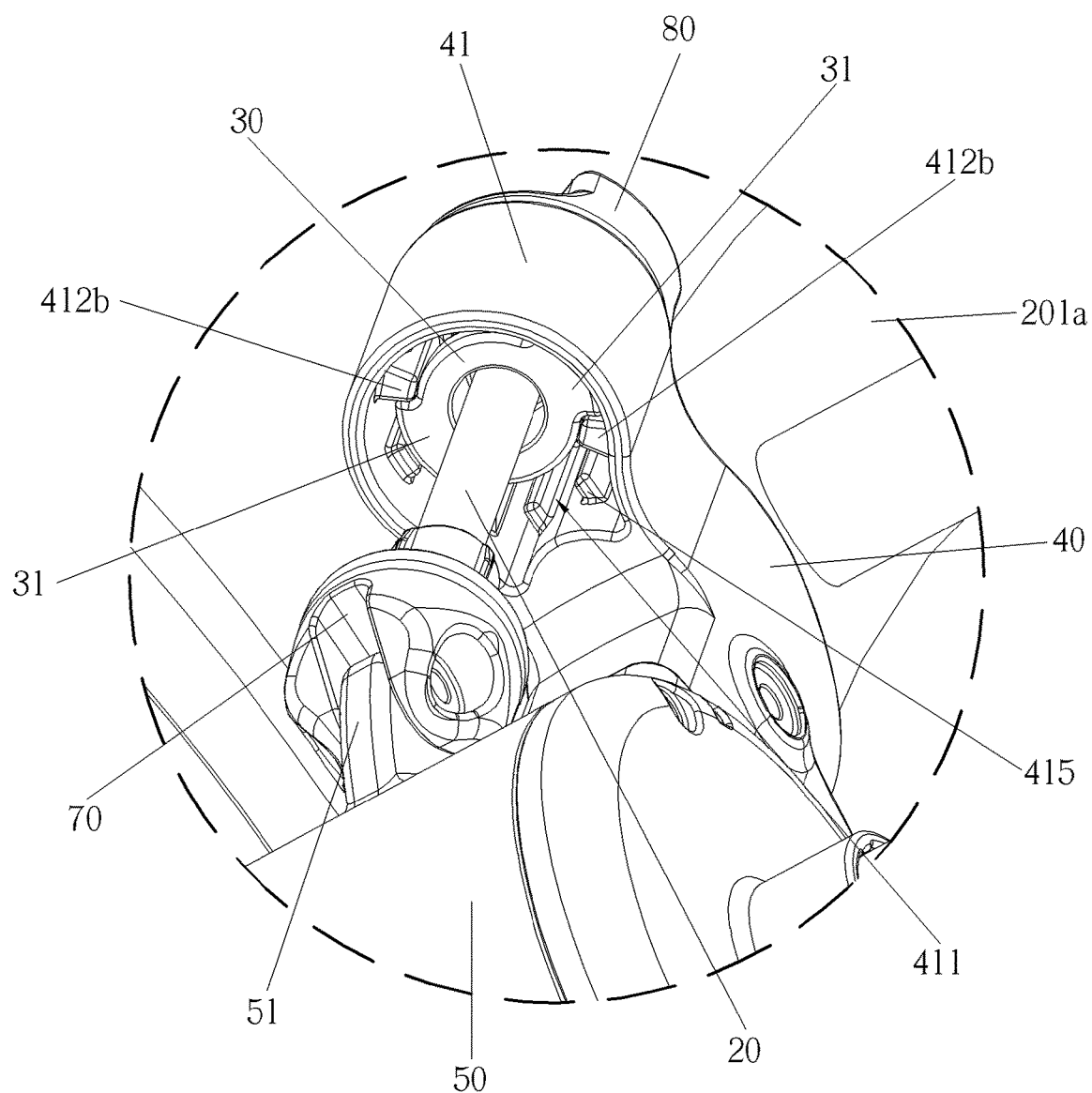
FIG. 10 is an enlarged view of a portion, enclosed by the circle C, of the vibration dampening device in FIG. 9.

Please refer to FIG. 1 to FIG. 4. An infant carrier 200 according the invention includes a carrier frame 201, a wheel 202, and a vibration dampening device 100. The vibration dampening device 100 is disposed between the carrier frame 201 and the wheel 202, so that jolts of the infant carrier 200 can be reduced when the infant carrier 200 moves on a road. Therein, the vibration dampening device 100 include a first vibration dampening part 10, a second vibration dampening part 20, and an actuator 30. The first vibration dampening part 10 is disposed between the carrier frame 201 and the wheel 202. The second vibration dampening part 20 is disposed between the carrier frame 201 and the wheel 202. Preferably, in the embodiment, the first vibration dampening part 10 is a vibration dampening spring, and the second vibration dampening part 20 is an elastic vibration dampening core. Therein, the vibration dampening core can be made of Hytrel (thermoplastic polyester elastomer, TPEE), TPE (Thermoplastic Elastomer) or other compressible materials, so that the vibration dampening device 100 can be simple and practicably realized;

however, the invention is not limited thereto. In other embodiments, based on actual use requirements, the first vibration dampening part 10 and the second vibration dampening part 20 can be flexibly replaced with other vibration dampening parts having vibration dampening effect, which will not be described further herein. The actuator 30 is movably disposed on the carrier frame 201. The actuator 30 has a releasing position (as shown by FIG. 3 and FIG. 6) and an enabling position (as shown by FIG. 7 and FIG. 8) relative to the carrier frame 201 and the wheel 202, for adjusting an action range of the second vibration dampening part 20 moving to the actuator 30. Thereby, the action range can be adjusted by adjusting the position of the actuator 30 for making an vibration dampening effect performed by the first vibration dampening part 10 or by the first vibration dampening part 10 together with the second vibration dampening part 20, so that the infant carrier 200 can adapt to different road conditions by adjusting the vibration dampening device 100 through the actuator 30. In practice, the positions for the actuator 30 are not limited thereto. In other embodiments, the actuator 30 can be movably disposed on the wheel 202, which also can switch the second vibration dampening part 20 and perform the vibration dampening effect. The disposition of the actuator 30 can be flexibly decided according to actual use requirements, which will not be described further herein.

In the embodiment, the vibration dampening device 100 can meet requirements for dampening vibration on roads by adjusting the second vibration dampening part 20 through the actuator 30, so the vibration dampening device 100 has a good adaptability. In other words, when the infant carrier 200 encounters different road conditions, the actuator 30 of the vibration dampening device 100 can be operated to be switched to the releasing position or the enabling position, so that the vibration dampening effect performed by the first vibration dampening part 10 individually or by both the first vibration dampening part 10 and the second vibration dampening part 20 for adapting the infant carriers 200 to various roads with different bumpy degrees for meeting requirements for dampening vibration on the roads. The infant carrier 200 according to the invention can perform good vibration dampening effect under various road conditions, which greatly improves the adaptability of the infant carrier 200 to various road conditions and can guarantee comfort and safety to the infants sitting therein.

Please refer to FIG. 6 for more details. In the embodiment, when the actuator 30 is located at the releasing position as shown by FIG. 6, the actuator 30 is separated from the second vibration dampening part 20 by a first movement distance S1. The first movement distance S1 is larger than zero. That is, the actuator 30 departs from the second vibration dampening part 20, so the second vibration dampening part 20 can move relative to the actuator 30 within the first movement distance S1. Therein, the first movement distance S1 allows the second vibration dampening part 20 to move relative to the carrier frame 201 without contacting the actuator 30, so that the second vibration dampening part 20 will not contribute to the vibration dampening effect, which is performed by the first vibration dampening part 10 independently.

Please refer to FIG. 8. When the actuator 30 is located at the enabling position as shown by FIG. 8, the actuator 30 is separated from the second vibration dampening part 20 by a second movement distance S2. The second movement distance S2 is preferably larger than zero. The second movement distance S2 is shorter than the first movement distance S1. The second vibration dampening part 20 can move relative to the actuator 30 within the second movement distance S2. For this configuration, the first vibration dampening part 10 and the second vibration dampening part 20 perform the vibration dampening effect together. That is, when the first vibration dampening part 10 bears a larger compression force, the second vibration dampening part 20 can contact the actuator 30. When the first vibration dampening part 10 bears a less compression force, the second vibration dampening part 20 can move relative to the actuator 30 within the second movement distance S2 but will not contact the actuator 30. Therefore, the second vibration dampening part 20 has a chance to contact the actuator 30 and then performs the vibration dampening effect together with the first vibration dampening part 10; thereby, when the actuator 30 is located at the enabling position, the first vibration dampening part 10 and the second vibration dampening part 20 perform the vibration dampening effect together. In practice, in another embodiment, the second movement distance S2 can be equal to zero, so that the second vibration dampening part 20 always contacts the actuator 30 and then the second vibration dampening part 20 can keep performing the vibration dampening effect together with the first vibration dampening part 10. Thereby, when the actuator 30 is located at the enabling position, the first vibration dampening part 10 and the second vibration dampening part 20 perform the vibration dampening effect together.

Please refer to FIG. 1 to FIG. 4. The vibration dampening device 100 further includes a mount 40 and a rotational base 50. The mount 40 is disposed on the carrier frame 201. The rotational base 50 is pivotally connected to the mount 40. Preferably, in the embodiment, a limitation post 52 is disposed on the rotational base 50. The limitation post 52 (or the extension direction of the limitation post 52) is parallel to the rotation axis of the rotational base 50. The mount 40 has an arc limitation slot 42 extending about the rotation axis of the rotational base 50. That is, the arc limitation slot 42 extends in a rotation direction of the rotational base 50; the arc limitation slot 42 extends along an arc, the center of which is the rotation axis of the rotational base 50. The limitation post 52 slidably passes through the arc limitation slot 42 (also referring to FIG. 6) for limiting the rotation range of the rotational base 50 relative to the mount 40 and further preventing the first vibration dampening part 10 and/or the second vibration dampening part 20 from disengaging from the mount 40 and the rotational base 50 due to an excessive rotation angle of the rotational base 50. In practice, in other embodiments, the limitation post 52 can be disposed on the mount 40 while the arc limitation slot 42 is disposed on the rotational base 50 accordingly. This configuration also can avoid an excessive rotation angle of the rotational base 50, which will not be described further herein.

Furthermore, the wheel 202 is disposed on the rotational base 50. The first vibration dampening part 10 and the second vibration dampening part 20 are disposed between the mount 40 and the rotational base 50. In other words, the mount 40, the rotational base 50, and the first vibration dampening part 10 are connected to form a triangular structure. An edge of the triangular structure at which the first vibration dampening part 10 is located can be elastically stretched or compressed. The mount 40, the rotational base 50, and the second vibration dampening part 20 are connected to form another triangular structure. An edge of the another triangular structure at which the second vibration dampening part 20 is located can be elastically stretched or compressed. When the rotational base 50 pivots relative to the mount 40, the first vibration dampening part 10 and the second vibration dampening part 20 can perform the vibration dampening effect. The configuration is simple and practicable. The actuator 30 is movably disposed on the mount 40, which carries out the structure of the actuator 30 being movably disposed on the carrier frame 201.

Specifically, in the embodiment, the carrier frame 201 has two rear supporting legs 201a. Each of the two rear supporting legs 201a is provided with the vibration dampening device 100 at the lower end thereof. Furthermore, the mount 40 of the vibration dampening device 100 is disposed at the lower end of the corresponding rear supporting leg 201a. The two wheels 202 located at two sides of the carrier frame 201 are disposed on the rotational bases 50 of the vibration dampening devices 100 respectively. Thereby, the infant carrier 200 according to the invention has a good and balanced vibration dampening effect. However, the location and quantity of the vibration dampening device 100 are not limited thereto. In other embodiments, the location and quantity of the vibration dampening device 100 can be flexibly decided and designed according to actual use requirements, which will not be described further herein.

Please refer to FIG. 3 to FIG. 8. Specifically, in the embodiment, the first vibration dampening part 10 (or the extension direction of the first vibration dampening part 10) is perpendicular to the rotation axis of the rotational base 50 relative to the mount 40. The second vibration dampening part 20 is disposed parallel to the first vibration dampening part 10; i.e. the vibration dampening parts 10 and 20 extend in the same direction. Thereby, the disposition orientation of the first vibration dampening part 10 and the second vibration dampening part 20 is more practicable. The first vibration dampening part 10 and the second vibration dampening part 20 elastically resist the rotation of the rotational base 50 relative to the mount 40 in the same direction. Therefore, the configuration is more simple and practicable.

Please refer to FIG. 3, FIG. 4, FIG. 6 and FIG. 8. The vibration dampening device 100 according to the invention further includes an upper base 60 and a lower base 70. An upper end of the upper base 60 is disposed on the mount 40. The lower base 70 is disposed on the rotational base 50. Specifically, in the embodiment, a lower end of the lower base 70 is pivotally connected to the rotational base 50. More specifically, the rotational base 50 has a pivotal connection portion 51 protruding outward. The lower base 70 is pivotally connected to the pivotal connection portion 51. The rotation axis of the lower base 70 is parallel to the rotation axis of the rotational base 50, so that the relative rotation of the rotational base 50 and the mount 40 and the relative rotation of the rotational base 50 and the lower base 70 occur at the same plane, and the configuration is more safe and practicable.

Furthermore, an upper end of the first vibration dampening part 10 abuts against the upper base 60. A lower end of the first vibration dampening part 10 abuts against the lower base 70. For more details, in the embodiment, a lower end of the upper base 60 has a first ring recess 61 with a downward opening. An upper end of the lower base 70 has an upward second ring recess 71. The upper end of the first vibration dampening part 10 abuts against the first ring recess 61. The lower end of the first vibration dampening part 10 abuts against the second ring recess 71. That is, the first vibration dampening part 10 is socketed between the first ring recess 61 and the second ring recess 71, so that the installation of the first vibration dampening part 10 between the upper base 60 and the lower base 70 is more simple and practicable.

Furthermore, a lower end of the second vibration dampening part 20 abuts against the lower base 70. An upper end of the second vibration dampening part 20 slidably passes through the upper base 60. Thereby, the second vibration dampening part 20 can move relative to the actuator 30 within the first movement distance S1 or the second movement distance S2. The disposition of the second vibration dampening part 20 is more practicable. For more details, in the embodiment, the lower base 70 has a socket slot 72. The lower end of the second vibration dampening part 20 is inserted in the socket slot 72. The upper base 60 has a through hole 62. The upper end of the second vibration dampening part 20 slidably passes through the through hole 62, which carries out the structure of the upper end of the second vibration dampening part 20 slidably passing through the upper base 60. Furthermore, in the embodiment, the second vibration dampening part 20 loosely passes through the first vibration dampening part 10 for reducing the room occupied by the first vibration dampening part 10 and the second vibration dampening part 20, but the invention is not limited thereto. In other embodiments, it is practicable to dispose the second vibration dampening part 20 outside the first vibration dampening part 10 with an according modification on the actuator 30, which also has the same function and will not be described further herein.

Figure 5:
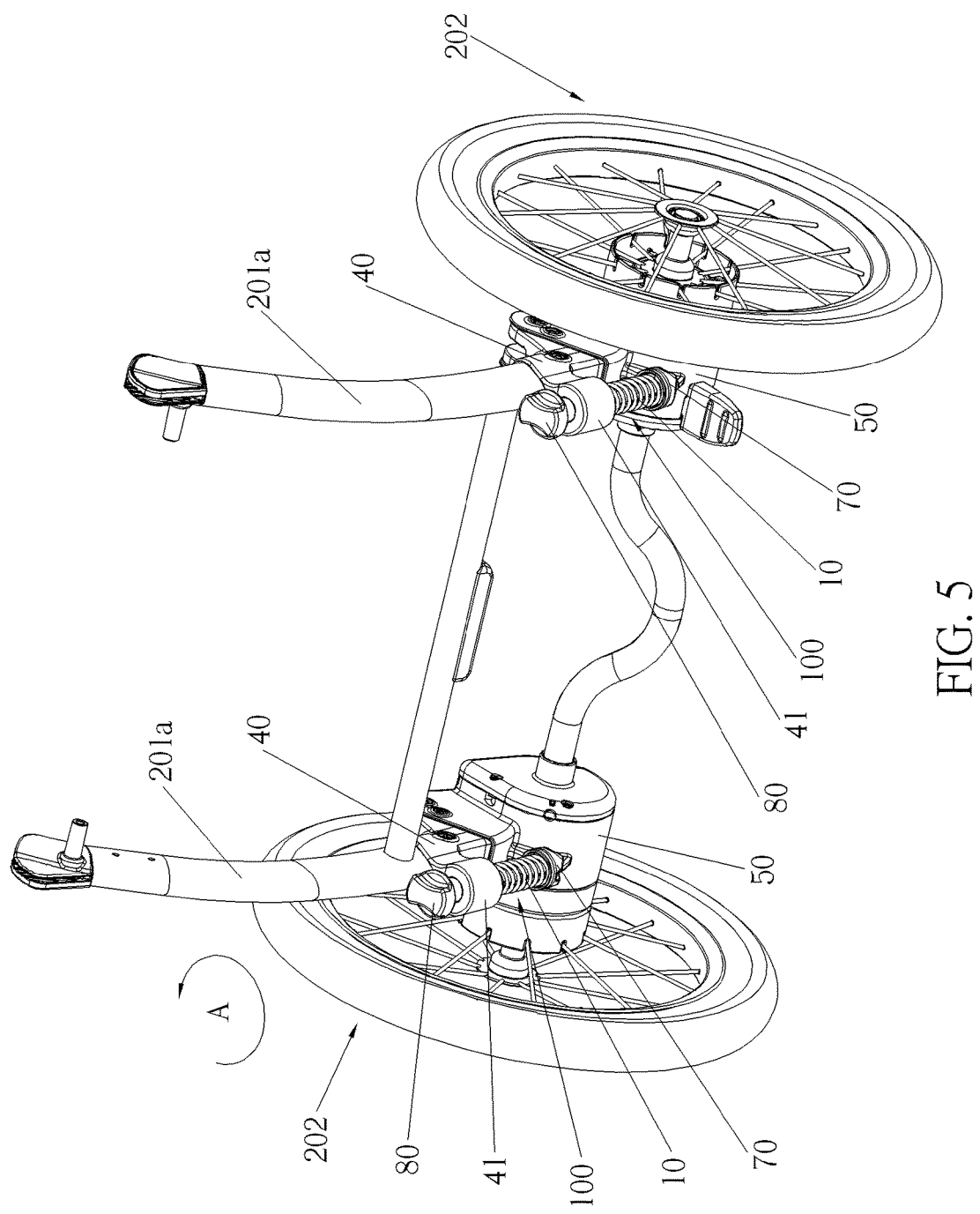
FIG. 5 is a schematic diagram illustrating the vibration dampening device in FIG. 2 from another view point.
Figure 11:
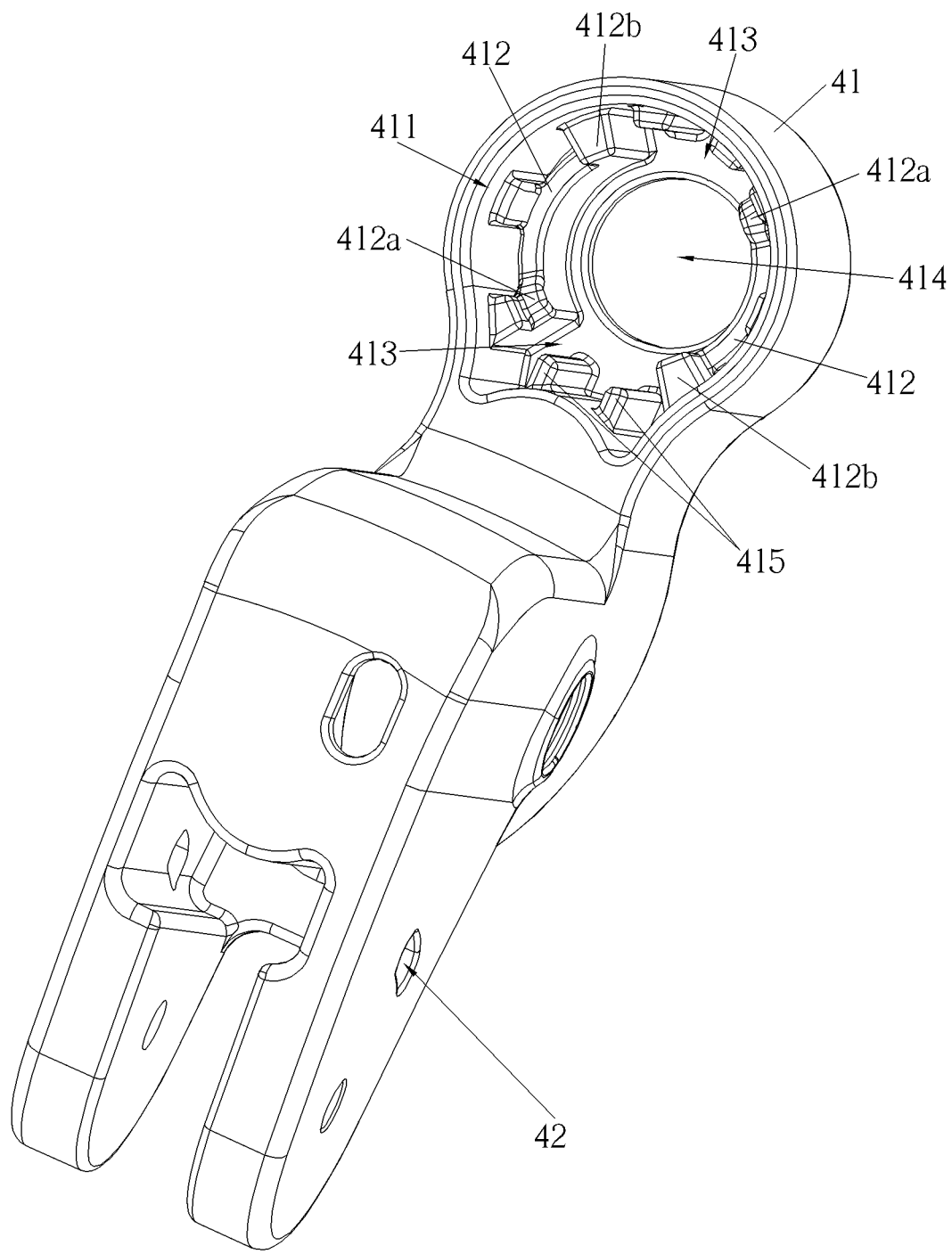
FIG. 11 is a schematic diagram illustrating a mount of the vibration dampening device.
Figure 12:
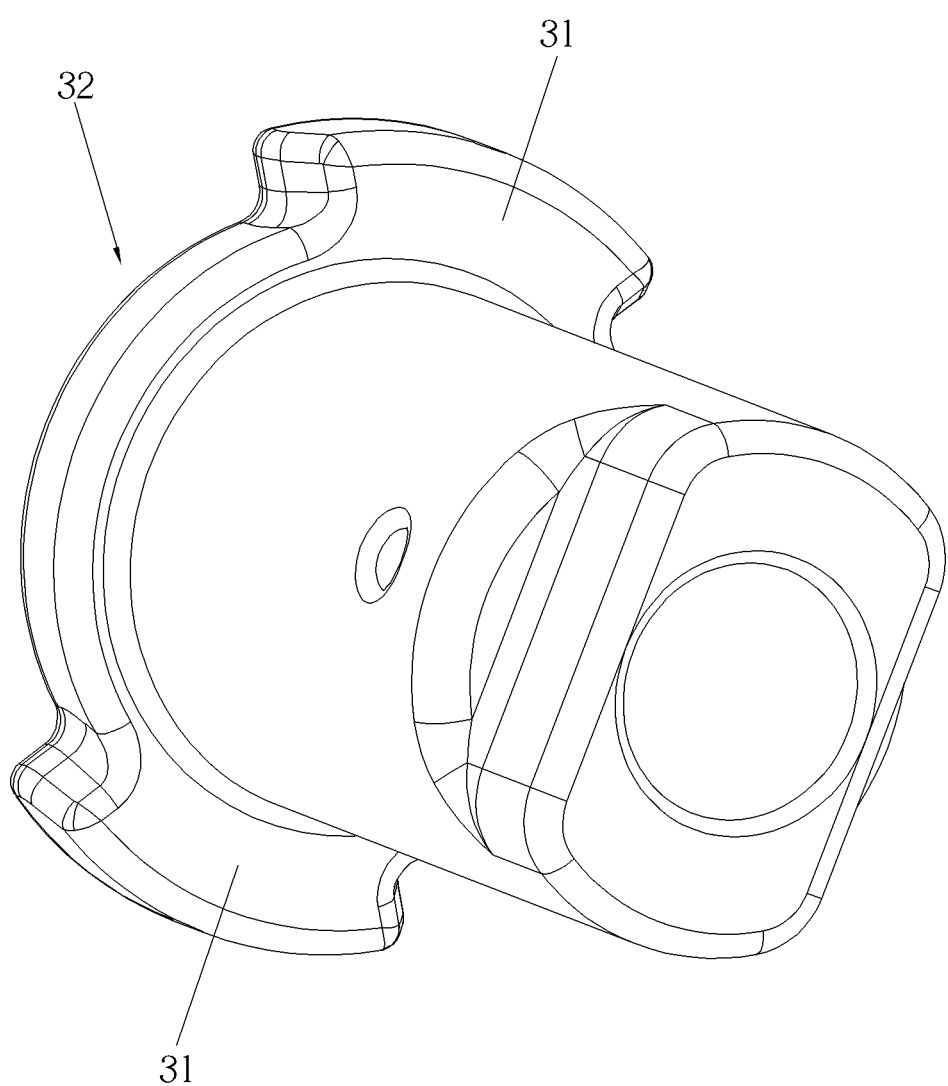
FIG. 12 is a schematic diagram illustrating the actuator of the vibration dampening device.

Please refer to FIG. 6, FIG. 8, and FIG. 9 to FIG. 12. The mount 40 has a protruding installation portion 41. The actuator 30 is movably disposed in the installation portion 41. The upper base 60 is disposed in the installation portion 41. For more details, in the embodiment, the installation portion 41 has an accommodating recess 411. The actuator 30 is partially slidably disposed in the accommodating recess 411. The actuator 30 can rotate in the accommodating recess 411. Therein, as shown by FIG. 11, two protrusive steps 412 are disposed on a recess wall of the accommodating recess 411 in a rotational direction of the actuator 30. A release passageway 413 is formed between the adjacent two protrusive steps 412 and provides the actuator 30 a sliding distance. As shown by FIG. 12, two blocked ribs 31 are disposed on a side wall of the actuator 30 in the rotational direction of the actuator 30 and respectively correspond to the two protrusive steps 412. An indentation 32 is formed between the adjacent two blocked ribs 31. As shown by FIG. 5 and FIG. 6, when the actuator 30 is located at the releasing position, the blocked ribs 31 align with the release passageways 413 respectively, so that the blocked ribs 31 fit in the corresponding release passageways 413 and the protrusive steps 412 fit in the corresponding indentations 32. Thereby, the interval between the actuator 30 and the upper end of the second vibration dampening part 20 is the first movement distance S1. The second vibration dampening part 20 is allowed to slide relative to the installation portion 41 so that the second vibration dampening part 20 will not contribute to the vibration dampening effect. As shown by FIG. 7 to FIG. 10, when the actuator 30 is located at the enabling position, the blocked ribs 31 are against the corresponding protrusive steps 412 and the release passageways 413 align with the indentations 32 respectively. Thereby, the interval between the actuator 30 and the second vibration dampening part 20 is shortened to be the second movement distance S2, so that the second vibration dampening part 20 and the first vibration dampening part 10 perform the vibration dampening effect together.

Furthermore, in the embodiment, the two protrusive steps 412 and the two release passageways 413 between the two protrusive steps 412 are uniformly distributed on the recess wall of the accommodating recess 411, so a switching manipulation of the actuator 30 needs rotating the actuator 30 by 90 degrees. That is, when the actuator 30 is required to be switched from the releasing position to the enabling position, the actuator 30 needs to be moved in a direction toward the second vibration dampening part 20 until the blocked ribs 31 depart from the release passageways 413. Then the actuator 30 needs to be rotated by 90 degrees, so that the blocked ribs 31 are against the protrusive steps 412 respectively and the indentations 32 align with the release passageways 413 respectively. Thereby, the actuator 30 is switched to the enabling position. When the actuator 30 is required to be switched from the enabling position to the releasing position, the actuator 30 needs to be rotated reversely by 90 degrees, so that the blocked ribs 31 align with and fit in the release passageways 413 respectively and the protrusive steps 412 fit in the indentations 32 respectively. Thereby, the actuator 30 is free of contact with the second vibration dampening part 20, so that the second vibration dampening part 20 will not be involved in the vibration dampening effect. However, the location and quantity of the protrusive steps 412 and the blocked ribs 31 are not limited thereto. In practice, the location and quantity can be flexibly decided according to actual use requirements, which will not be described further herein. Furthermore, the required rotation angle of the actuator 30 for switching the actuator 30 between the releasing position and the enabling position can be flexibly decided according to actual use requirements and is not limited thereto, which will not be described further herein.

Please refer to FIG. 11. Preferably, the protrusive step 412 has a curved transition portion 412*a* and a limitation protrusion 412*b* which are arranged separate in a direction (as indicated by an arrow A in FIG. 5) in which the actuator 30 rotates from the releasing position to the enabling position. When the actuator 30 is located at the enabling position, the blocked rib 31 is located between the curved transition portion 412*a* and the limitation protrusion 412*b*, and the limitation protrusion 412*b* blocks the blocked rib 31 from departing from the protrusive step 412. Therefore, the blocked rib 31 only can leave the protrusive step 412 from the curved transition portion 412*a*. When the blocked rib 31 is rotated in and completely contacts the protrusive step 412, the blocked rib 31 is blocked by the limitation protrusion 412*b* so that the actuator 30 is prevented from being rotated excessively to make the blocked rib 31 depart from the protrusive step 412 and the user is prompted that the actuator 30 is accurately located, which enhances the use of the actuator 30. Furthermore, when the blocked rib 31 is located between the curved transition portion 412*a* and the limitation protrusion 412*b*, under the obstruction by a gentle slope of the curved transition portion 412*a*, an external force is required to rotate the actuator 30 so that the blocked rib 31 can be driven to slide over the gentle slope of the curved transition portion 412*a* and leave the protrusive step 412. Thereby, when the actuator 30 is located at the enabling position, the blocked rib 31 can be effectively prevented from unexpectedly departing from the protrusive step 412, which makes the vibration dampening device 100 more safe and reliable.

Preferably, the vibration dampening device 100 according to the invention further includes an elastic restoring part 90. The elastic restoring part 90 is a spring preferably; however, the invention is not limited thereto. An upper end of the elastic restoring part 90 abuts against the actuator 30. A lower end of the elastic restoring part 90 abuts against one of the installation portion 41 and the upper base 60. The elastic restoring part 90 always urges the actuator 30 to move in a direction away from the second vibration dampening part 20. Thereby, when the actuator 30 is switched from the enabling position to the releasing position, as long as the blocked ribs 31 align with the corresponding release passageways 413 (or the protrusive steps 412 align with the corresponding indentations 32), the elastic restoring part 90 can drive the actuator 30 to depart from the upper end of the second vibration dampening part 20 until the blocked ribs 31 are against the inner side of the top portion of the accommodating recess 411, and then the actuator 30 remains at the releasing position. Therefore, the configuration is more practicable and more convenient to the user.

Please refer to FIG. 6. In the embodiment, the specific structure of the upper base 60 installed in the installation portion 41 is described in the following. Several supporting protrusions 415 are disposed on the recess wall of the accommodating recess 411 in the rotational direction of the actuator 30. The upper base 60 abuts against the supporting protrusions 415, so that the upper base 60 is clamped and fixed between the supporting protrusions 415 and the first vibration dampening part, which makes the installation structure of the upper base 60 simpler. However, the invention is not limited thereto.

Figure 4:
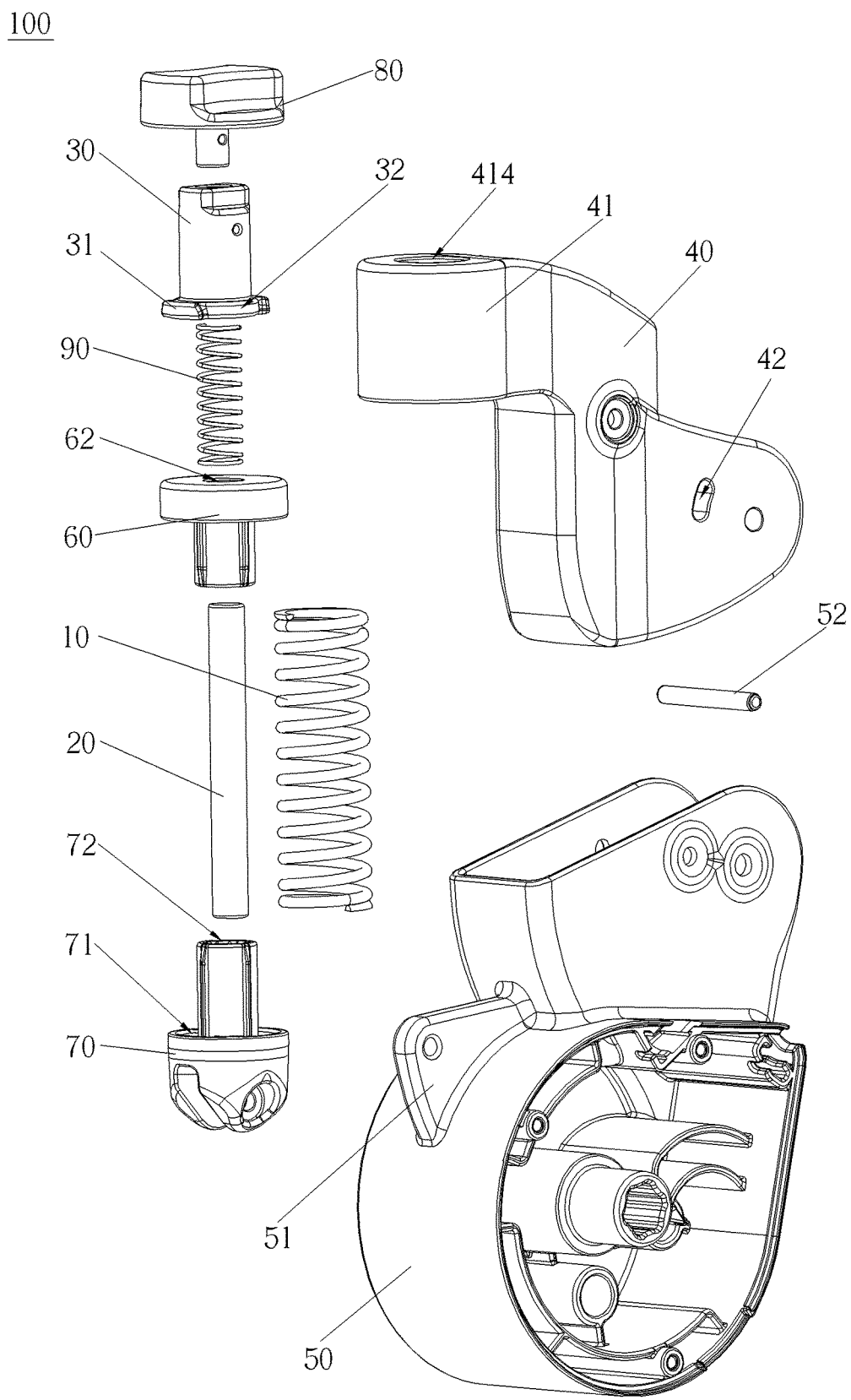
FIG. 4 is an exploded view of the vibration dampening device in FIG. 3.

Please refer to FIG. 3, FIG. 4 and FIG. 6. Preferably, the vibration dampening device 100 according to the invention further includes a manipulation part 80. The manipulation part 80 is disposed on an end of the actuator 30 away from the blocked ribs 31. The manipulation part 80 can be manipulated to drive the actuator 30 to slide and rotate relative to the installation portion 41. The configuration is more practicable and makes the manipulation of the actuator 30 more convenient. Specifically, the installation portion 41 has a through hole 414 at the top portion of the accommodating recess 411. The actuator 30 partially passes through the through hole 414 and is connected to the manipulation part 80. That is, the end of the actuator 30 away from the blocked ribs 31 slidably passes through the through hole 414. The manipulation part 80 is located outside the accommodating recess 411, so that it is convenient for the user to manipulate the manipulation part 80. The configuration is more practicable.

Referring to the figures, the operation of the vibration dampening device 100 according to the invention will be described in details in the following.

When the vibration dampening device 100 is required to be switched from performing the vibration dampening effect only by the first vibration dampening part 10 (as shown by FIG. 5 and FIG. 6) to performing the vibration dampening effect by both the first vibration dampening part 10 and the second vibration dampening part 20 (as shown by FIG. 7 and FIG. 8), the actuator 30 needs to be switched from the releasing position as shown by FIG. 5 and FIG. 6 to the enabling position as shown by FIG. 7 and FIG. 8. Specifically, first, the manipulation part 80 is moved to drive the actuator 30 to overcome the resilient force by the elastic restoring part 90 to move in the direction toward the second vibration dampening part 20 until the blocked ribs 31 depart from the release passageways 413. Then, the manipulation part 80 is rotated in the direction indicated by the arrow A in FIG. 5 to rotate the actuator 30 by 90 degrees, so that the blocked ribs 31 are against the corresponding protrusive steps 412. Under the resilient effect by the elastic restoring part 90, the actuator 30 can be clamped and fixed between the elastic restoring part 90 and the protrusive steps 412. The release passageways 413 align with the indentations 32 respectively. Thereby, the actuator 30 is switched to the enabling position as shown by FIG. 7 and FIG. 8. The actuator 30 and the second vibration dampening part 20 are separate by the second movement distance S2. The first vibration dampening part 10 and the second vibration dampening part 20 perform the vibration dampening effect together for adapting the infant carrier 200 to flat or slightly bumpy roads.

When the vibration dampening device 100 is required to be switched from performing the vibration dampening effect by both the first vibration dampening part 10 and the second vibration dampening part 20 (as shown by FIG. 7 and FIG. 8) to performing the vibration dampening effect only by the first vibration dampening part 10 (as shown by FIG. 5 and FIG. 6), the actuator 30 needs to be switched from the enabling position as shown by FIG. 7 and FIG. 8 to the releasing position as shown by FIG. 5 and FIG. 6. Specifically, first, the manipulation part 80 is rotated in the direction indicated by the arrow A in FIG. 5 to rotate in a direction indicated by an arrow B in FIG. 7 to reversely rotate the actuator 30 by 90 degrees, so that the blocked ribs 31 align with the corresponding release passageways 413 and the protrusive steps 412 align with the corresponding indentations 32. Then, under the resilient effect by the elastic restoring part 90, the actuator 30 is driven to move in the direction away from the second vibration dampening part 20 until the blocked ribs 31 are against the inner side of the top portion of the accommodating recess 411. Thereby, the actuator 30 is switched to the releasing position. Furthermore, under the resilient effect by the elastic restoring part 90, the actuator 30 remains at the releasing position. The actuator 30 and the second vibration dampening part 20 are separate by the first movement distance S1. The second vibration dampening part 20 will not be involved in the vibration dampening effect, which is performed by the first vibration dampening part 10 independently for adapting the infant carrier 200 to roads with larger bumpiness.

In the vibration dampening device 100 according to the invention, the first vibration dampening part 10 is disposed between the carrier frame 201 and the wheel 202, the second vibration dampening part 20 is disposed between the carrier frame 201 and the wheel 202, and the actuator 30 is movably disposed on one of the carrier frame 201 and the wheel 202. Therein, the actuator 30 has the releasing position and the enabling position for adjusting the action range of the second vibration dampening part 20 moving to the actuator 30. Therefore, the action range can be adjusted by adjusting the position of the actuator 30 for making the vibration dampening effect performed by the first vibration dampening part 10 or by the first vibration dampening part 10 together with the second vibration dampening part 20, so that the vibration dampening device 100 can adapt to different road conditions by adjusting the vibration dampening device 100 through the actuator 30. The vibration dampening device 100 according to the invention has a good adaptability, which improves the adaptability of the infant carrier 200 according to the invention to various road conditions and guarantees comfort and safety to the infant sitting in the infant carrier 200.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vibration dampening device used in an infant carrier which has a carrier frame and a wheel, the vibration dampening device being disposed between the carrier frame and the wheel, the vibration dampening device comprising:
   a first vibration dampening part disposed between the carrier frame and the wheel;
   a second vibration dampening part disposed between the carrier frame and the wheel; and
   an actuator movably disposed on one of the carrier frame and the wheel;
   wherein the actuator has a releasing position and an enabling position for adjusting an action range of the second vibration dampening part moving to the actuator, the actuator is separated from the second vibration dampening part by a first movement distance when the actuator is located at the releasing position, the first movement distance is longer than zero, the second vibration dampening part is movable relative to the actuator within the first movement distance, the actuator is separated from the second vibration dampening part by a second movement distance when the actuator is located at the enabling position, the second movement distance is longer than or equal to zero, the second movement distance is shorter than the first movement distance, and the second vibration dampening part is movable relative to the actuator within the second movement distance or contacts the actuator.

2. The vibration dampening device of claim 1, further comprising a mount and a rotational base, wherein the mount is disposed on the carrier frame, the rotational base is pivotally connected to the mount, the wheel is disposed on the rotational base, the first vibration dampening part and the second vibration dampening part are disposed between the mount and the rotational base, and the actuator is movably disposed on the mount.

3. The vibration dampening device of claim 2, wherein a limitation post is disposed on one of the rotational base and the mount, the limitation post is parallel to a rotation axis of the rotational base, the other one of the rotational base and the mount has an arc limitation slot extending about the rotation axis of the rotational base, and the limitation post slidably passes through the arc limitation slot.

4. The vibration dampening device of claim 2, wherein the first vibration dampening part is disposed perpendicular to a rotation axis of the rotational base, and the second vibration dampening part is disposed parallel to the first vibration dampening part.

5. The vibration dampening device of claim 2, further comprising an upper base and a lower base, wherein the upper base is disposed on the mount, the lower base is disposed on the rotational base, an upper end of the first vibration dampening part abuts against the upper base, and a lower end of the first vibration dampening part abuts against the lower base.

6. The vibration dampening device of claim 5, wherein a lower end of the lower base is pivotally connected to the rotational base, and a rotation axis of the lower base is parallel to a rotation axis of the rotational base.

7. The vibration dampening device of claim 6, wherein the rotational base has a pivotal connection portion protruding outward, the lower base is pivotally connected to the pivotal connection portion.

8. The vibration dampening device of claim 5, wherein the upper base has a first ring recess with a downward opening, the lower base has a second ring recess with an upward opening, the upper end of the first vibration dampening part abuts against the first ring recess, and the lower end of the first vibration dampening part abuts against the second ring recess.

9. The vibration dampening device of claim 5, wherein a lower end of the second vibration dampening part abuts against the lower base, and an upper end of the second vibration dampening part slidably passes through the upper base.

10. The vibration dampening device of claim 9, wherein the lower base has a socket slot, the lower end of the second vibration dampening part is inserted in the socket slot, the upper base has a through hole, and the upper end of the second vibration dampening part slidably passes through the through hole.

11. The vibration dampening device of claim 9, wherein the second vibration dampening part passes through the first vibration dampening part.

12. The vibration dampening device of claim 9, wherein the mount has a protruding installation portion, the actuator is movably disposed in the installation portion, and the upper base is disposed in the installation portion.

13. The vibration dampening device of claim 12, wherein the installation portion has an accommodating recess, the actuator is partially slidably disposed in the accommodating recess, the actuator is rotatable in the accommodating recess, at least two protrusive steps are disposed on a recess wall of the accommodating recess in a rotational direction of the actuator, a release passageway is formed between adjacent two of the at least two protrusive steps, at least one blocked rib is disposed on a side wall of the actuator in the rotational direction of the actuator, when the actuator is located at the releasing position, the blocked rib is aligned with the release passageway, and when the actuator is located at the enabling position, the blocked rib is aligned with one of the at least two protrusive steps and is against the aligned protrusive step.

14. The vibration dampening device of claim 13, wherein the protrusive step has a curved transition portion and a limitation protrusion, and when the actuator is located at the enabling position, the blocked rib is located between the curved transition portion and the limitation protrusion.

15. The vibration dampening device of claim 13, further comprising a manipulation part disposed on the actuator.

16. The vibration dampening device of claim 15, wherein the installation portion has a through hole, and the actuator partially passes through the through hole and is connected to the manipulation part.

17. The vibration dampening device of claim 12, further comprising an elastic restoring part, wherein an upper end of the elastic restoring part abuts against the actuator, a lower end of the elastic restoring part abuts against one of the installation portion and the upper base, and the elastic restoring part always urges the actuator to move in a direction away from the second vibration dampening part.

18. The vibration dampening device of claim 13, wherein at least one supporting protrusion is disposed on the recess wall of the accommodating recess, and the upper base abuts against the at least one supporting protrusion.

19. The vibration dampening device of claim 1, wherein the first vibration dampening part is a vibration dampening spring.

20. The vibration dampening device of claim 1, wherein the second vibration dampening part is an elastic vibration dampening core.

21. An infant carrier, comprising:
a carrier frame having a rear supporting leg;
a wheel; and
a vibration dampening device disposed between the carrier frame and the wheel and on the rear supporting leg, the vibration dampening device comprising:
a first vibration dampening part disposed between the carrier frame and the wheel;
a second vibration dampening part disposed between the carrier frame and the wheel; and
an actuator movably disposed on one of the carrier frame and the wheel;
wherein the actuator has a releasing position and an enabling position for adjusting an action range of the second vibration dampening part moving to the actuator.

* * * * *